United States Patent
Bogrets et al.

[11] 3,820,969
[45] June 28, 1974

[54] APPARATUS FOR MAKING PROFILED ARTICLES

[76] Inventors: German Nikolaevich Bogrets, Oktyabrskaya ploschad, 5, kv. 18; Oleg Alexeevich Semenov, ulitsa Kirona 8, kv. 30; Vyacheslav Fedorovich Dudkin, ulitsa Lenina 1, kv. 57, all of Dnepropetrovsk; Anatoly Konstantinovich Vorontsov, Donetskoi oblasti prospekt Lomonosova, 166, kv. 2, Konstantinovka Donetskoi, all of U.S.S.R.

[22] Filed: July 29, 1971

[21] Appl. No.: 167,124

[52] U.S. Cl. ............ 65/184, 65/106, 65/273, 65/275, 65/185, 72/52
[51] Int. Cl. .................... C03b 5/32, C03b 23/00
[58] Field of Search ....... 65/185, 67, 106, 273, 275, 65/184; 72/52, 108, 109, 275

[56] References Cited
UNITED STATES PATENTS

| | | | |
|---|---|---|---|
| 869,704 | 10/1907 | Gerers | 72/52 X |
| 1,645,086 | 10/1927 | Berry et al. | 65/109 |
| 2,140,213 | 12/1938 | Tegarty | 65/185 X |
| 2,601,744 | 7/1952 | Everett | 65/108 |
| 2,613,479 | 10/1952 | Stong | 65/108 |
| 2,911,932 | 11/1959 | Kinkead | 72/52 X |
| 3,164,896 | 11/1965 | Fullman | 72/52 X |
| 3,263,053 | 7/1966 | Rudd | 65/185 X |
| 3,659,028 | 4/1972 | Harcorr | 65/185 X |
| 3,740,207 | 6/1973 | Bogrets et al. | 65/67 |

*Primary Examiner*—Frank W. Miga
*Attorney, Agent, or Firm*—Eric H. Waters

[57] ABSTRACT

An apparatus for making profiled articles from an advancing strip of thermoplastic materials such as glass comprising a pair of spaced opposed forming elements which are supported on plates adapted for imparting reciprocatory movement to said forming elements both in a direction towards and away from one another and in a direction of advance of the strip. A rod is pivotably supported on the plates and is movable therewith, and a mandrel is secured to the rod to follow reciprocation of the plates in the direction of advance of the strip and to undergo pivotal movement with the rod. The mandrel is disposed between the forming elements and the advancing strip bent around the mandrel by the forming elements when the latter move towards one another. The rod is pivoted during reciprocatory movement thereof by engagement of a pin on a lever secured to the rod in an inclined guide slot in a fixed member. Such pivotal movement of the rod causes the mandrel first to press the thus bent strip against the forming elements and thereafter to retract therefrom and allow free passage of the thus formed strip.

4 Claims, 4 Drawing Figures

APPARATUS FOR MAKING PROFILED ARTICLES

The invention relates to apparatus intended to form profiled articles from thermoplastic materials, i.e., materials softenable under heating, for example, glass, metal, and plastics (synthetic substances of organic origin).

Known in the art is an apparatus to form profiled articles from a glass strip in plastic condition, comprising forming elements that move towards each other and at the same time in the direction of movement of the glass strip, and a mandrel about which the glass strip bends in the forming process, and which together with the forming elements performs a reciprocatory movement along the strip.

The articles are produced by forming elements executing complex motions. First they are moved together, embrace the mandrel, and at the same time move in the direction of the strip feed by one feed step, whereupon they are separated and returned to their initial position to effect the next feed step and form the subsequent portion of the strip.

In the process of forming, the mandrel is subject to friction against the surface of the strips both for an open or a closed profile, which causes its intense wear, thus reducing the production potentialities of the installation as a whole.

Additionally, the mandrel does not permit making articles of open profile having a complex shape with some projections on their surface which serve for aesthetic purposes, or for connecting the articles to each other.

It is an object of this invention to provide an apparatus for making profiled articles, that reduces the friction of the operative part of the mandrel against the strip surface, and for obtaining aticles of open profile having a complex shape with some projections on their surface.

With these and other objects in view, in an apparatus for making profiled articles from a strip of thermoplastic material by means for forming elements executing reciprocatory motion towards each other and in the direction of the strip feed for bending the strip about a mandrel fixed on a rod, which mandrel recirpocates together with the forming elements along the strip, the mandrel is, according to the invention, supported with respect to the forming elements so as to be capable of displacements in the vertical plane parallel to the direction of the strip movement.

To impart vertical displacement of the mandrel, a rod on which the mandrel is secured, can be connected to a lever, one end of which is freely located in an inclined guide slot made in the bed.

To obtain articles of open profile having a complex shape, the guide slot is advantageously inclined to the horizontal at an acute angle pointed in the direction of the strip movement.

To obtain tubular articles, the guide slot may be inclined to the horizontal at an acute angle pointed in a direction opposite to that of the strip movement.

The concept of the proposed invention is as follows.

In the process of forming articles of closed profile from a thermoplastic strip, the mandrel, during each feed stroke, is pressed by its working surface against the upper inner portion of the strip, and during the back stroke the mandrel returns to its initial position and descends without touching the strip being formed so as to freely allows its passage forward. Thus, friction of the mandrel against the strip surface is eliminated.

This is realized due to the fact, that the cross-sectional profile of the mandrel is congruent with half the profile of the article being formed.

When making articles of open profile and complex shape, the mandrel has the form of the article.

In the process of forming such articles, the mandrel during each feed stroke, is pressed by its working surface against the strip portion to be formed, thus imparting thereto the preset shape, for example, forming projections, and during the reverse stroke to the initial position the material is pressed upwards to permit free forward passage of the formed strip portion.

For a better appreciation of the concept of the invention, there are appended hereto drawings of a particular embodiment of the apparatus according to the invention, wherein.

Figure 1:
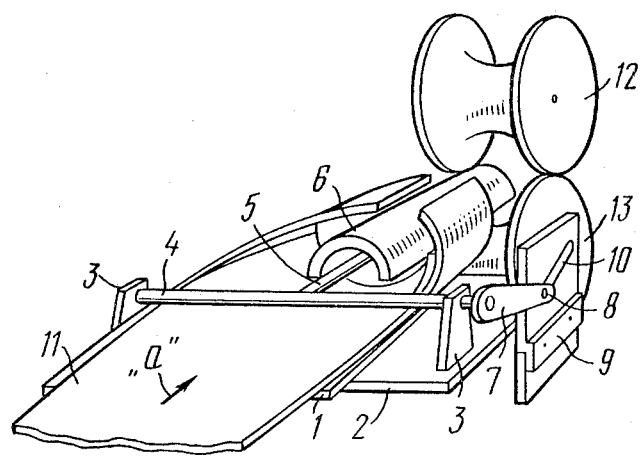
FIG. 1 is a perspective view of the forming elements of an apparatus for making tubular articles from a glass strip, the forming elements being moved apart and the mandrel being lowered.
Figure 2:
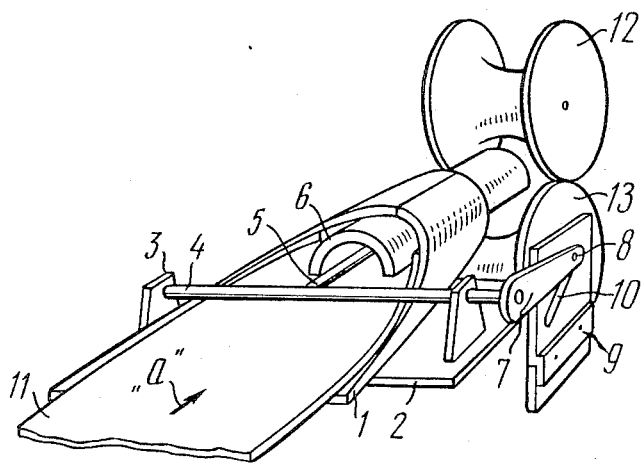
FIG. 2 is a similar view with the forming elements being brought together and the mandrel raised.
Figure 3:
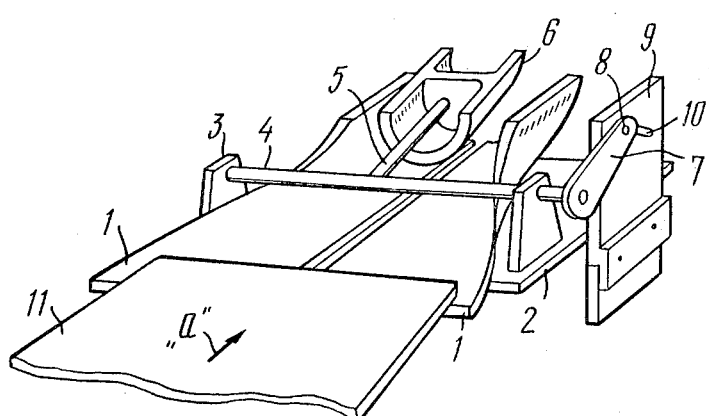
FIG. 3 is a perspective view of the forming elements of an apparatus for forming a glass strip in semi-cylindrical shape, the forming elements being moved apart and the mandrel being raised.
Figure 4:
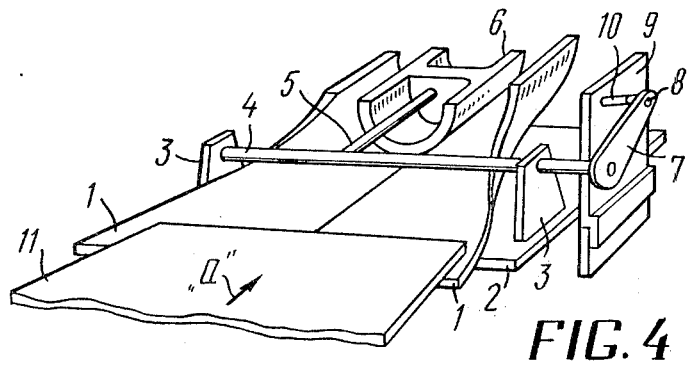
FIG. 4 is a similar view with the forming elements being moved together.

The apparatus shown in the drawings comprises a pair of opposed forming elements 1 (FIGS. 1–4) attached to plates 2 which are mounted on a bed so as to be capable of reciprocatory motion in the direction of the glass strip feed and towards and away from each other (the bed and the mechanisms to move the forming elements are conventional and not shown in the drawings). Rigidly secured on plates 2 are stands 3, in which a rod 4 is mounted in bearings. Attached to the middle of rod 4 are a mandrel holder 5 with a mandrel 6. Each end of rod 4 is connected to a lever 7, one end of which is fitted with a pin 8.

Rigidly secured on the bed are elements 9 with inclined guide slots 10, in which the pins 8 are disposed.

The aforedescribed fixing of mandrel 6 and its connection with the forming elements 1 enables it to be displaced in the vertical plane parallel to the direction of movement of the glass strip 11.

The guide slot 10 can be made inclined in one or the other direction depending on the type of article to be produced. Thus, a slot inclined to the horizontal at an acute angle pointed in the direction of the strip movement provides for the production of articles having a semicylindrical profile, and a slot inclined at the same angle pointed in the direction opposite to the strip movement provides for making tubular articles.

The apparatus also includes two gauging drive rolls 12 and 13.

The apparatus operates as follows.

The glass strip 11 (FIG. 1) is continuously fed at a constant rate on the forming elements 1, which in the initial position are moved apart. Mandrel 6 is placed in the initial position so that one of its ends is located within the zone of the gauge rolls 12 and 13.

As the strip is moved to one feed step (as is shown by arrow "*a*"), the forming elements start approaching each other. The glass strip 11, which is in a plastic condition, bends and together with the forming elements 1 and mandrel 6 moves one feed step.

The mandrel serves to support the strip edges resting thereon.

At the last moment of the strip within the zone of the forming elements, its edges will assume the required profile.

In forming tubular articles, this is realized by to the upward displacement of the mandrel, to press the strip against the inner working surface of the forming elements 1.

When the forming elements move in the direction of the strip feed, rod 4 moving in the same direction entrains lever 7, pin 8 of the latter thus sliding in slot 10 to force rod 4 to turn through a certain angle.

Mandrel 6 will swing through the same angle and be lifted to the uppermost position to press the strip against the upper inner surface of the forming elements.

The forming elements 1 then move apart and return to their initial position for the next feed stroke, while the mandrel descends without touching the lower portion of the formed strip to allow free passage thereof.

Thereafter, the forming elements 1 are again moved together, and the mandrel is lifted and pressed against the closing strip edges so that the next section of the tubular article is thus formed.

The forming articles of open profile, for example of, semi-cylindrical shape, is effected in similar manner.

However, to form projections on the surface of the strip, the mandrel moves downwards, and is pressed against the inner surface of the partially formed glass strip which is in plastic condition.

For this purpose rod 4, in the course of movement of the forming elements in the direction of the strip feed entrains lever 7 whose pin 8 sides in slot 10 (FIGS. 3, 4), rod 4 thus turning and lowering mandrel 6.

The gauge rolls 12 and 13 reduce the product to the required size and shape.

As follows from the above description, the proposed apparatus makes it possible to manufacture articles of open profile with a complex shape and projections, as well as articles of closed profile, such as tubular sections, and it also provides for a significant reduction in the friction of the operative part of the mandrel against the surface of the formed strip.

What we claim is:

1. An apparatus for making profiled articles from an advancing strip of thermoplastic material such as glass, said apparatus comprising a pair of spaced, opposed forming elements, plates supporting said forming elements for imparting reciprocatory movement thereto both in a direction towards and away from one another, and in the direction of advance of the strip, a rod pivotably supported on said plates and movable therewith, a mandrel secured to said rod to follow reciprocation of the plates in the direction of advance of the strip and to undergo pivotal movement with said rod, said mandrel being disposed between said forming elements so that the advancing strip is bent around the mandrel by said forming elements when the latter move towards one another, and means for pivoting said rod during reciprocatory movement thereof to cause the mandrel to be vertically displaced first to press the thus bent strip against said forming elements and thereafter to retract therefrom and allow free passage of the thus formed strip.

2. Apparatus as claimed in claim 1 wherein said means for pivoting said rod comprises a lever connected to said rod, a pin secured to said lever and a fixed member having an inclined guide slot in which said pin travels.

3. Apparatus as claimed in claim 2 wherein to obtain articles of open profile having a complex shape, said guide slot is inclined to the horizontal at an acute angle and extends in the direction of advance of the strip.

4. Apparatus as claimed in claim 2 wherein to obtain tubular articles, said guide slot is inclined to the horizontal at an acute angle and extends in a direction opposite to the advance of the strip.

* * * * *